Nov. 14, 1933.  K. RASCHIG ET AL  1,934,817
PROCESS AND DEVICE FOR THE MANUFACTURE OF PLATES, SECTION PIECES,
OR THE LIKE FROM PHENOL-FORMALDEHYDE ARTIFICIAL RESINS
Filed April 19, 1930
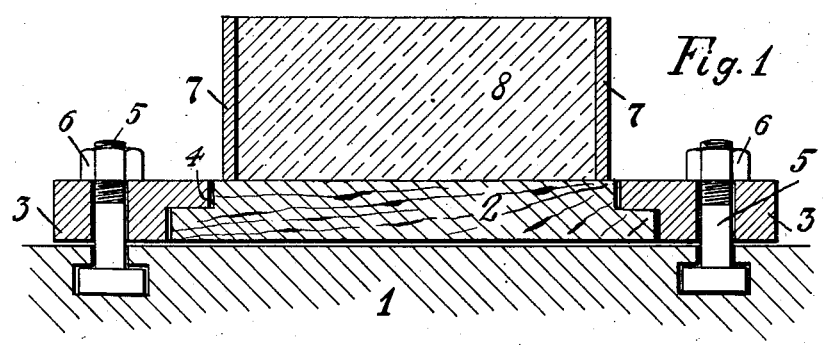
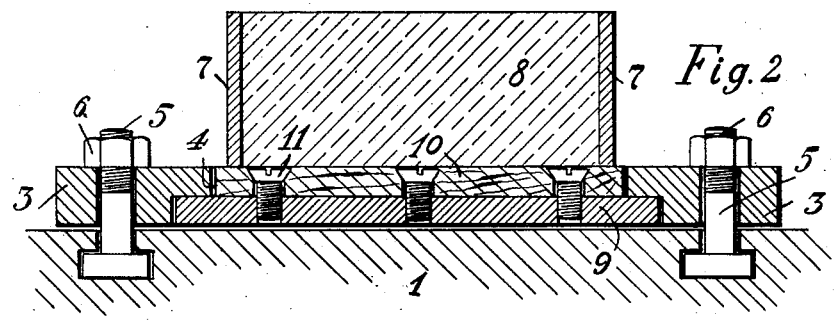
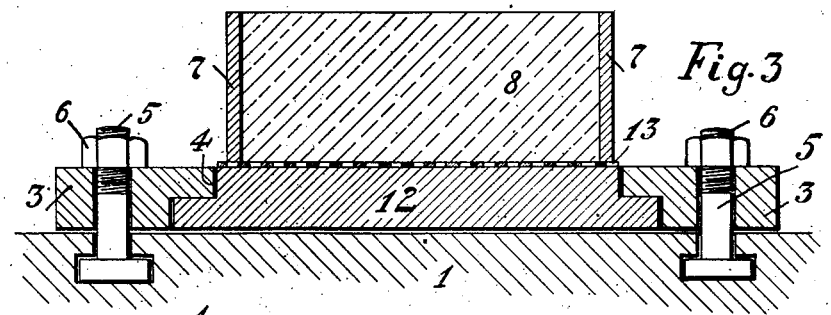
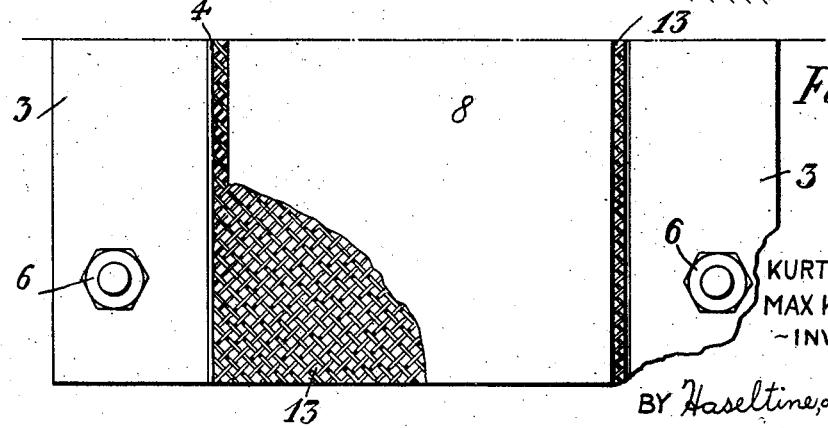
KURT RASCHIG,
MAX KOEBNER,
—INVENTORS
BY Haseltine, Lake & Co.
ATTORNEYS Patented Nov. 14, 1933

1,934,817

UNITED STATES PATENT OFFICE 1,934,817

PROCESS AND DEVICE FOR THE MANUFACTURE OF PLATES, SECTION PIECES, OR THE LIKE FROM PHENOL-FORMALDEHYDE ARTIFICIAL RESINS

Kurt Raschig and Max Koebner, Ludwigshafen-on-the-Rhine, Germany, assignors to Dr. F. Raschig G. m. b. H., Ludwigshafen-on-the-Rhine, Germany, a firm of Germany Application April 19, 1930, Serial No. 445,821, and in Germany April 20, 1929

2 Claims. (Cl. 18—55)

It is known that phenol-formaldehyde artificial resins can be cut with relative ease when they are in an intermediate stage of the hardening. It has not, however, hitherto been possible to apply this property in an art in which it would be of the greatest use, that is to say to the manufacture from the resins of plates or the like having a large surface area and little thickness; for in the premature stage of hardening the material is so sticky that it adheres to the knife and breaks away in pieces, whilst in other, later stages of the hardening, the material has become so elastic and similar to rubber that it cannot be mounted in a suitable manner for cutting. It has indeed been attempted to secure a soft block of artificial resin to a support by means of a press, clamps, atmospheric pressure or the like in a manner analogous to that adopted in cutting celluloid; it has not been possible, however, to combine a block of resin so intimately with the support that it can be cut into plates of the kind above referred to by means of the cutting machines commonly used in the celluloid industry.

The present invention relates to a process whereby the mass of resin to be cut can be mounted in such a manner that it is possible to cut from it plates or the like by means of the usual celluloid cutting machines. According to the invention the artificial resin is poured, whilst it is still liquid, on to a support which is contained in a mould and has a surface of such a character that the resin can penetrate partially into the support, so that on solidifying it becomes intimately combined therewith. The resin is then hardened by heating in known manner to the stage at which it can be cut; it is then removed from the mould together with its support and is cut at a raised temperature by means of a cutting machine, such as is used in the celluloid industry.

It is advantageous that the block of resin which has been hardened to the stage at which it can be cut, be transferred directly from the hardening chamber to the cutting machine, so that the heat contained in the resin serves to maintain it at a temperature suitable for cutting. However, in cases in which the number of cutting machines available do not permit cutting the blocks of resin into plates immediately after the hardening operation, the blocks may be allowed to cool and may be softened to a degree at which they can be cut by a subsequent heating operation. This procedure, however, has the disadvantage that the material becomes progressively harder and more brittle on heating; since external heat applied to the block penetrates only gradually into the interior, the portions of the block adjoining its surface are subjected to the action of heat for a longer time than the interior portions of the block, so that they become hardened more quickly and also become more brittle. The result is that in some cases the cutting may be unsatisfactory, and in some circumstances the production of very thin plates may be impossible.

The support for the block of resin may be formed in various ways, for example it may consist of wood or another porous material into which the liquid artificial resin can penetrate to such a degree that the solidified cast resin becomes intimately united with the support. The support of wood or other porous material may be carried on a base of metal, for example iron, to which it is secured in a suitable manner, such as by means of an adhesive or by means of screws. There may be used a support, the surface of which is provided with notches or recesses; or the surface of the support may be covered by means of wire netting which is attached to the support, for instance by soldering. The liquid artificial resin enters the depressions in the surface or the meshes of the net and on solidification becomes firmly united with the support. It is also possible to use a support consisting of hardened artificial resin and having a smooth surface; the liquid artificial resin becomes firmly combined with such a support. Such a support may be simply a residual layer of hardened artificial resin remaining on the bottom of the mould from a preceding operation.

If it is attempted to cut an artificial resin softened by heat secured to a support only by mechanical means, the resin invariably becomes detached from the support; most surprisingly, however, this does not happen if the resin is applied to the support before it is hardened to the stage at which it can be cut, so that it can become intimately combined with the support. It is, above all, surprising that the union of the resin with the support is so intimate that the block can withstand, without becoming detached or broken, the very considerable lateral pressure exerted by the knife in the direction of cutting and the perpendicular upwardly directed stress. The invention renders it possible to cut artificial resins into plates by means of cutting machines, such as are used in the celluloid industry without any necessity for modifying the machine. It is possible by the process in accordance with the invention to cut plates having an area of a square metre and more, and of any desired thickness, which may be even as low as a fraction of a millimetre.

The invention offers the further advantage that a block of resin can be cut practically completely, that is to say without leaving a residue which would be unavoidable were the mass to be cut held by means engaging its sides. At the present time there is not a sufficient use in the artificial resin industry for such residues, so that considered from this aspect the economic value of a process in which the block must be secured by means of clamps or the like engaging its sides is very questionable.

For example, on the bottom or on a side wall of a sheet metal mould is placed a support consisting of a plate of oak having a thickness of 2 centimetres and the mould is filled with a liquid phenol-formaldehyde artificial resin. The resin is hardened by heating for several days at 80–100° C. until it has attained a suitable hardness, whereupon the resin which is now firmly united to the support, is removed from the mould and the support is secured by lateral pressure to the table of a celluloid cutting machine. Plates of any desired thickness can now be cut from the block of resin in the usual manner. It is advantageous to leave on the support a layer of artificial resin and to use the support in this condition for receiving in a further operation a further quantity of liquid artificial resin to be hardened and cut; the liquid artificial resin becomes united sufficiently firmly with the layer of hardened resin remaining on the support.

In the accompanying drawing, forming part hereof,

Fig. 1 illustrates in section an example of the invention as applied in practice, where the support is of wood.

Fig. 2 shows in a similar section how the wooden support may be secured to a metal plate.

Fig. 3 is also a sectional view in which the support is of metal overlaid with a wire netting to enhance the efficiency of the support.

Fig. 4 is a plan view of the same wherein the mould is omitted and part of the resin block broken away to better show the wire netting.

Throughout the views, the same reference numerals indicate the same or duplicate parts.

A table or other general support or base upon which the device as a whole may be located is indicated by reference 1, and in the first view a flat wooden support member 2 is secured thereto by means of undercut anchoring blocks 3, 3. These may be of metal and extend across the base 1 and engage corresponding recesses 4 on flat member 2. The anchoring blocks 3, 3 are secured to the base 1 by means of bolts or screws 5, 5 and nuts 6, 6. A mould 7, preferably of sheet metal is placed upon flat support member 2 and serves as a receptacle for a liquid phenol-formaldehyde condensation product which is poured into said mould. When this resin is sufficiently hardened, it forms a block 8 which is firmly united to support member 2, and after removal of mould 7 and anchoring blocks 3, 3, may be transferred with member 2 to the celluloid cutting machine.

In Fig. 2, the wood support member 10 is secured upon a metal plate 9 by means of screws 11, 11, while in Figs. 3 and 4, a metal plate 12 with a wire netting or other perforate metal structure secured or soldered thereto serves as the support for the resin block 8. In the last view, the mould 7 is omitted and a portion of the resin block broken away to more fully reveal the appearance and relative position of the wire netting or the like.

What we claim is:—

1. The process of manufacturing plates, section pieces and the like from artificial phenol-formaldehyde resins, which in a combined group of steps consists in first pouring said resins in a fluid state upon a support member forming the bottom of a mould, whereby to cause said resins to penetrate the surface structure of said support member so as to permanently unite therewith, cooling and congealing said poured resins whereby to intimately combine the same with the surface structure of said support member and prevent lateral displacement of said congealed resins with respect to said support member when freed from the mould, then raising the temperature of said congealed resins to harden the same and render the same capable of being cut, furthermore removing said congealed resins together with the supporting member as a unit from said mould and finally cutting the same at the acquired hardening temperature.

2. The process of manufacturing plates, section pieces and the like from artificial phenol-formaldehyde resins, which in a combined group of steps consists in first pouring said resins in a fluid state upon a support member forming the bottom of a mould, whereby to cause said resins to penetrate the surface structure of said support member so as to permanently unite therewith, cooling and congealing said poured resins whereby to intimately combine the same with the surface structure of said support member and prevent lateral displacement of said congealed resins with respect to said support member when the support member and the congealed resins are freed together as a unit from the mould, then raising the temperature of said congealed resins to harden the same and render the same capable of being cut, and as the final step immediately cutting said congealed resins at the acquired hardening temperature in order to utilize the heat contained in the mass of said resins before loss thereof by radiation and conduction.

KURT RASCHIG.
MAX KOEBNER.